United States Patent
Endo

(10) Patent No.: US 9,340,118 B2
(45) Date of Patent: May 17, 2016

(54) CHARGING CONTROL APPARATUS FOR AN ELECTRICITY STORAGE APPARATUS IN A VEHICLE

(75) Inventor: Kazuhiko Endo, Toyota (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 863 days.

(21) Appl. No.: 13/455,407

(22) Filed: Apr. 25, 2012

(65) Prior Publication Data

US 2012/0274276 A1 Nov. 1, 2012

(30) Foreign Application Priority Data

Apr. 27, 2011 (JP) .................................. 2011-099922

(51) Int. Cl.
*B60L 11/18* (2006.01)
*B60R 25/20* (2013.01)

(52) U.S. Cl.
CPC ......... *B60L 11/1846* (2013.01); *B60L 11/1816* (2013.01); *B60R 25/2018* (2013.01); *B60L 2250/10* (2013.01); *B60L 2270/36* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
None
See application file for complete search history.

(56) References Cited

U.S. PATENT DOCUMENTS

| 8,321,081 B2* | 11/2012 | Nakamura | 701/22 |
| 2010/0204865 A1* | 8/2010 | Nakamura | 701/22 |
| 2012/0105002 A1* | 5/2012 | Eikeland et al. | 320/109 |

FOREIGN PATENT DOCUMENTS

| JP | 2003-72519 | 3/2003 |
| JP | 2007-228695 | 7/2007 |
| JP | 2010-134566 | 6/2010 |
| JP | 2010-200530 | 9/2010 |

OTHER PUBLICATIONS

Office action dated May 7, 2013 in corresponding Japanese Application No. 2011-099922.

* cited by examiner

*Primary Examiner* — A. M. Thompson
(74) *Attorney, Agent, or Firm* — Harness, Dickey & Pierce, P.L.C.

(57) ABSTRACT

When detecting an abnormality, an in-vehicle wireless instrument in a plug-in vehicle sends an abnormality occurrence notification to a mobile terminal via an information center. The mobile terminal performs a notification to notify a user of the abnormality having occurred in the plug-in vehicle. When the user performs a charging forbiddance manipulation based on the notification, the mobile terminal sends a charging forbidding command to a power management ECU in the vehicle via the information center and the in-vehicle wireless instrument. When receiving the charging forbidding command, the power management ECU stops charging a battery using an external power source, and sends a setting completion notification to the mobile terminal via the in-vehicle wireless instrument and the information center. When receiving the setting completion notification, the mobile terminal notifies the user that the charging is stopped.

18 Claims, 4 Drawing Sheets

CHARGING CONTROL APPARATUS FOR AN ELECTRICITY STORAGE APPARATUS IN A VEHICLE

CROSS REFERENCE TO RELATED APPLICATION

This application is based on Japanese Patent Application No. 2011-99922 filed on Apr. 27, 2011, the disclosure of which is incorporated herein by reference.

TECHNICAL FIELD

The present disclosure relates to a charging control apparatus, which controls electric charging for an electricity storage apparatus provided in a vehicle.

BACKGROUND

[Patent document 1] JP 2003-72519 A

Usually, a vehicle is equipped with multiple electric and electronic apparatuses, which are powered by an electricity storage apparatus (also referred to as a battery) mounted in the vehicle. Accordingly, it is important to charge the electricity storage apparatus sufficiently to secure that the multiple electric and electronic apparatuses operate in a proper way. Thus, in recent years, various arts are suggested so that lack of electricity stored in the electricity storage apparatus is not likely to occur.

For example, Patent document 1 discloses an art to reduce a power consumption of the battery in a case where the battery is not charged and the engine is stopped. Specifically, an anti-theft apparatus disclosed in Patent document 1 includes an apparatus for detecting a theft, and an apparatus for warning and notifying of the detected theft. In this anti-theft apparatus, in cases where the engine is being operated and the battery has been charged, both the apparatus for detecting a theft and the apparatus for warning and notifying of the detected theft are supplied with electric power. Further, in cases where the engine is being unoperated and the battery has not been charged, the apparatus for detecting a theft is supplied with electric power, but the apparatus for warning and notifying of the detected theft is not supplied with electric power. Additionally, when a theft is detected, the apparatus for warning and notifying of the detected theft is supplied with electric power. Under the above-described configuration, even when the battery is not being charged, supplying electric power to the apparatus for detecting a theft is continued minimally. Thereby, the detection of a theft is still enabled while power consumption of the battery can be reduced to help prevent running out of the battery.

In recent years, a practical use of a vehicle (i.e., plug-in vehicles) equipped with an electricity storage apparatus is promoted. The electricity storage apparatus provided in the vehicle can be charged using an external power source while the vehicle is not being used by a user.

However, in consideration of preventing a theft of a vehicle, it is preferable to cause a lack of electricity stored in the electricity storage apparatus. That is, in some cases, the electricity stored in the electricity storage apparatus needs to be insufficient by consuming the electricity storage.

SUMMARY

It is an object of the present disclosure to provide a charging control apparatus, which controls charging of an electricity storage apparatus depending on different situations, to thereby consume electricity stored in the electricity storage apparatus or stop charging the electricity storage apparatus.

To achieve the above object, according to an aspect of the present disclosure, a charging control apparatus is provided as follows. The charging control apparatus includes a charging portion, a detection section, and a charging control section. The charging control apparatus is for controlling an electricity storage apparatus, which is provided in a vehicle and rechargeable using an electric power source placed external to the vehicle. The charging portion switches over between a charging permitted state and a charging forbidden state. In the charging permitted state, charging the electricity storage apparatus using the electric power source is permitted; and in the charging forbidden state, charging the electricity storage apparatus using the electric power source is forbidden. The detection section detects an abnormality that occurs in the vehicle. The charging control section performs a charging forbiddance control to cause the charging portion to switch over between the charging permitted state and the charging forbidden state. The charging control section is configured to cause the charging portion to switch over to the charging forbidden state, as the charging forbiddance control, when an abnormality that occurs in the vehicle is detected by the detection section.

Under such a configuration, when an abnormality is detected, charging of the electricity storage apparatus can be forbidden. Herein, the abnormality may include an unauthorized entry or unlawful entry to the vehicle, or a vehicle theft, which needs to forbid the electricity storage apparatus from being charged using the external electric power source. Thus, charging the electricity storage apparatus can be controlled depending on different situations, to thereby consume the electricity stored in the electricity storage apparatus or stop charging the electricity storage apparatus.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

An embodiment of the present disclosure will be described with reference to the drawings.

[1. Overall Configuration]

Figure 1:
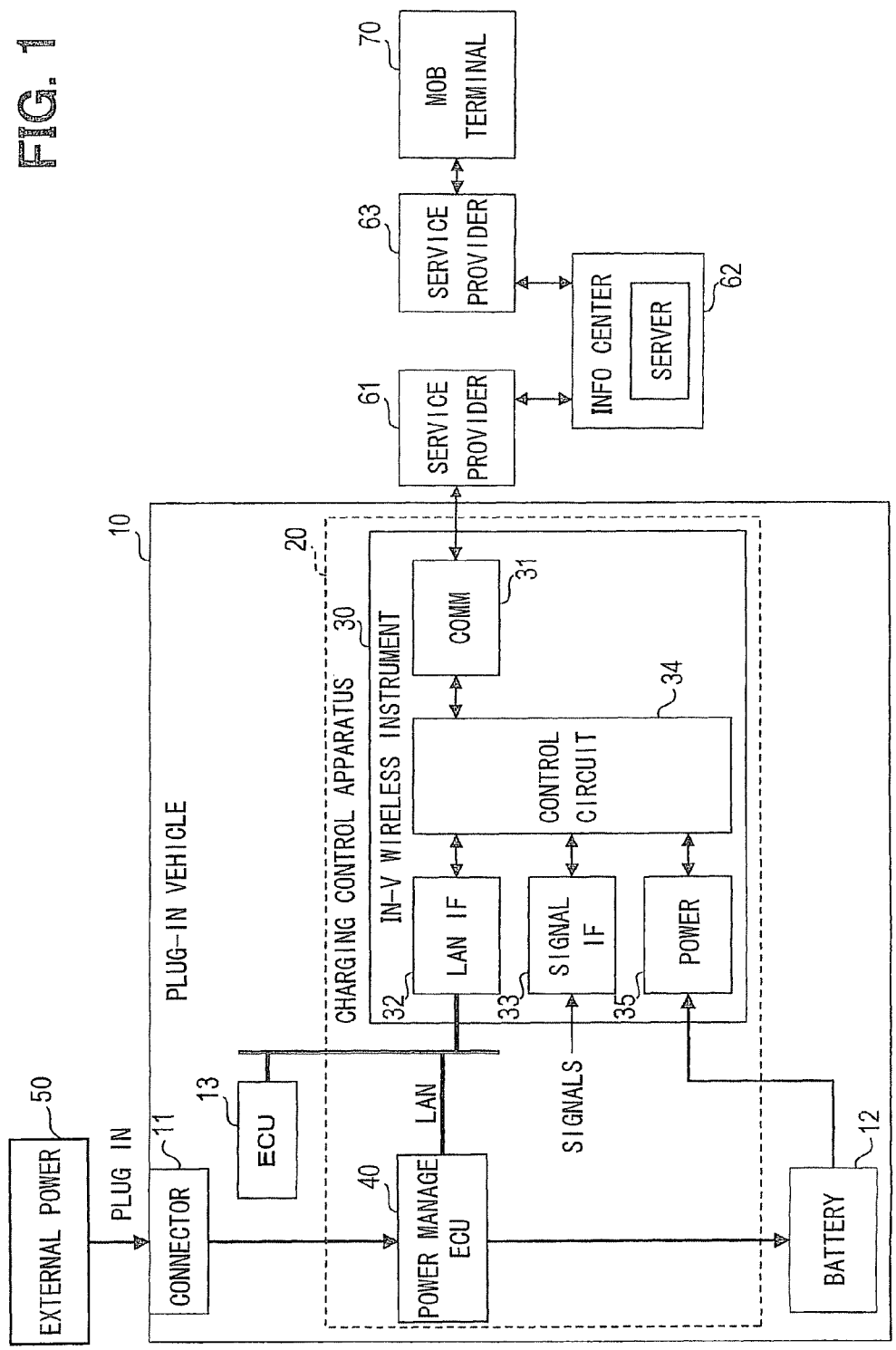
FIG. 1 is a block diagram illustrating a configuration of a remote charging control system according to an embodiment of the present disclosure.

FIG. 1 is a block diagram showing a configuration of a remote charging control system.

The remote charging control system includes a charging control apparatus 20, and a mobile terminal 70, which are wirelessly communicable with each other. The charging control apparatus 20 is provided in or mounted in a plug-in vehicle 10. The mobile terminal 70 is carried by a user or an owner of the plug-in vehicle 10. Specifically, the charging control apparatus 20 is configured to be communicable with the mobile terminal 70 via a mobile phone network that includes a communication service provider 61, an information center 62, and a communication service provider 63 in FIG. 1. The plug-in vehicle 10 is a vehicle equipped with an electricity storage apparatus 12 (also referred to as a battery 12), which can be charged by an electric power source placed external to the vehicle. Hereinafter, the electric power source placed external to the vehicle is referred to as an external electric power source 50. The external electric power source 50 may include household electric power source and commercial electric power source. That is, the plug-in vehicle 10 is rechargeable by plugging into the external electric power source 50. For example, the plug-in vehicle 10 includes an electric vehicle (EV) and a plug-in hybrid vehicle (PHV). The information center 62 performs overall management of information sent from in-vehicle wireless instruments 30 mounted in several vehicles. The information center 62 is equipped with a server that functions as an information management apparatus, and an operator at the information center 62 is ready to answer inquiries from users.

The charging control apparatus 20 includes an in-vehicle wireless instrument 30, and a power management electronic control unit (ECU) 40. A data communication module (DCM), which performs wireless communication by connecting to the mobile phone network, may be used as the in-vehicle wireless instrument 30. The in-vehicle wireless instrument 30 includes a wireless communication portion 31, an in-vehicle local area network (LAN) interface 32, a signal interface 33, a control circuit 34, and an electric power source 35.

The wireless communication portion 31 is communicable via a mobile phone network. Thus, the in-vehicle wireless instrument 30 is communicable with the mobile terminal 70, which is placed external to the plug-in vehicle 10, via the mobile phone network. The wireless communication portion 31 detects a present position of the plug-in vehicle 10 by receiving radio wave signals sent from global positioning system (GPS) satellites.

The in-vehicle LAN interface 32 communicates with various Electronic Control Units (ECUs) mounted in the plug-in vehicle 10. That is, a communication network (in-vehicle LAN) is configured to connect the ECUs mounted in the plug-in vehicle 10. The in-vehicle wireless instrument 30 is configured to be communicable with the various ECUs via the in-vehicle LAN. In an example shown in FIG. 1, the ECUs include an ECU 13, and the power management ECU 40.

The signal interface 33 directly receives signals related to the plug-in vehicle 10 from predetermined apparatuses mounted in the plug-in vehicle 10. The signals related to the plug-in vehicle 10 may include an airbag signal (collision detection signal), a vehicle speed signal, an emergency notification switch signal and the like.

The control circuit 34 includes a central processing unit (CPU) to perform an overall control of the charging control apparatus 20 as well as the wireless instrument 30. Further, the control circuit 34 detects an abnormality of the plug-in vehicle 10 according to signals received via the in-vehicle LAN interface 32 and the signal interface 33.

The electric power source 35 generates a predetermined operation voltage from a voltage provided by the battery 12, and provides the predetermined operation voltage to each portion of the in-vehicle wireless instrument 30. As shown in FIG. 1, electric source of the in-vehicle wireless instrument 30 is directly supplied by the battery 12. Further, a voltage inverter may be disposed between the battery 12 and the in-vehicle wireless instrument 30. That is, a configuration between the battery 12 and the in-vehicle wireless instrument 30 is not limited to the configuration shown in FIG. 1.

The in-vehicle wireless instrument 30 has an alert notification function, and a tracking function. Specifically, in the alert notification function, the in-vehicle wireless instrument 30 detects that a door, which has been locked, is unlocked; thereby, the in-vehicle wireless instrument 30 activates an alert and notifies the mobile terminal 70. In the tracing function, the in-vehicle wireless instrument 30 determines that the plug-in vehicle 10 got stolen and is being moved; thereby, the in-vehicle wireless instrument 30 sends the present position detected by the GPS, to the mobile terminal 70.

The power management ECU 40 controls supply of electric power. In the present embodiment, the power management ECU 40 is disposed in an electric power charging path from the external electric power source 50 to the battery 12. The power management ECU 40 is configured to switch over between two operation states. One operation state is charging permitted state in which the battery 12 is permitted to be charged by the external electric power source 50. The other operation state is charging forbidden state in which the battery 12 is forbidden to be charged by the external electric power source 50.

Further, the mobile terminal 70 enables the user of the plug-in vehicle 10 to perform a remote operation to the charging control apparatus 20. The user manipulates the mobile terminal 70 to perform the remote operation. The mobile terminal 70 may be achieved using a mobile phone apparatus (for example, a smart phone) where an application program for a special purpose is installed. The remote operation to the charging control apparatus 20 enables a charging start/stop operation to start/stop charging the battery 12 using the external electric power source 50. The remote operation also enables sending information related to a state of the plug-in vehicle 10 to the in-vehicle wireless instrument 30 and confirming the information on a display screen of the mobile terminal 70. The information related to a state of the plug-in vehicle 10 may include, for example, charging state information of the battery, remaining battery power, and a possible running distance. The charging state information of the battery is indicative of (i) a state in which charging is started, (ii) a state in which charging is stopped, (iii) a state in which the external electric power source 50 is plugged in, or (iv) a state in which the external electric power source 50 is not plugged in.

[2. Process]

Figure 2:
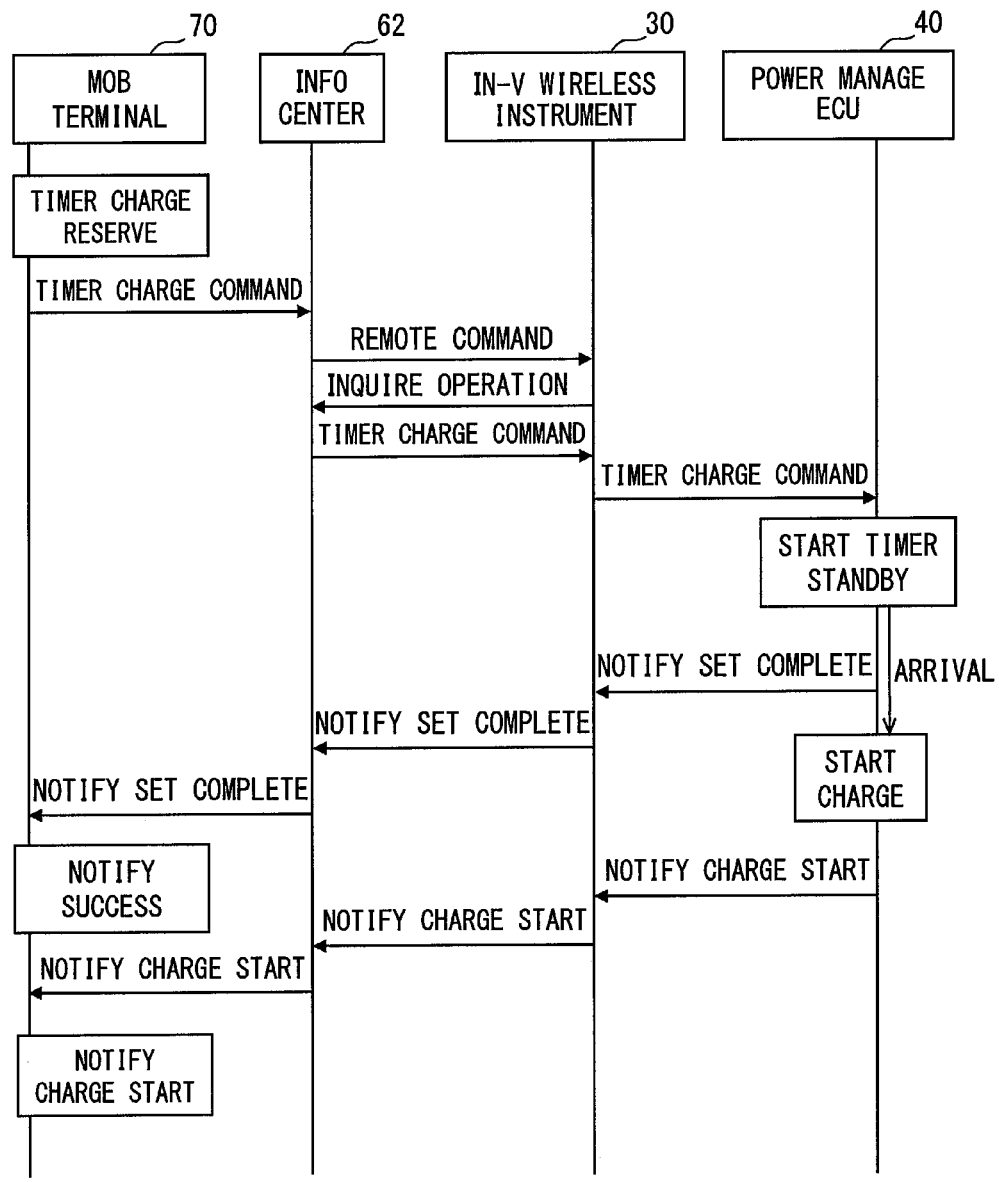
FIG. 2 is a sequence diagram illustrating an example in which charging a battery starts when a predetermined set time arrives.

A process executed by the remote charging control system according to the present embodiment will be described with reference to FIG. 2 to FIG. 4. The communication service providers 61 and 63 are omitted in the following description and in FIG. 2 to FIG. 4.

First, with reference to FIG. 2, a sequence of a charging process will be described. An initial state of the charging process shown in FIG. 2 is on the premise that (i) the external electric power source 50 is connected to or plugged into a connector 11 of the plug-in vehicle 10, and (ii) the power management ECU 40 is in the charging forbidden state. In this sequence, a user performs a remote operation to the charging control apparatus 20 with the mobile terminal 70 to start charging; thereby, charging the battery 12 of the plug-in vehicle 10 using the external electric power source 50 starts when a predetermined set time, which is set by a timer, arrives. For example, charging the battery 12 may be set to start when a set time period elapses, or when a set time and date arrives.

The Above-described timer charging reservation enables start of the charging when the set time arrives. When the user starts a timer charging reservation, the mobile terminal 70 sends a timer charging command to the information center 62. The timer charging command includes information related to the set time. Upon receipt of the timer charging command from the mobile terminal 70, the information center 62 sends a remote operation command to the in-vehicle wireless instrument 30 in the charging control apparatus 20. The remote operation command notifies the charging control apparatus 20 that the remote operation is executed by the user with the mobile terminal 70. Upon receipt of the remote operation command from the information center 62, the in-vehicle wireless instrument 30 inquiries of the information center 62 about an operation, thereby receiving the timer charging command from the information center 62. Then, the in-vehicle wireless instrument 30 sends the timer charging command to the power management ECU 40.

Upon receipt of the timer charging command from the in-vehicle wireless instrument 30, the power management ECU 40 starts a timer standby process and sends a setting completion notification to the in-vehicle wireless instrument 30. The in-vehicle wireless instrument 30 sends the setting completion notification to the mobile terminal 70 via the information center 62. Upon receipt of the setting completion notification from the in-vehicle wireless instrument 30, the mobile terminal 70 notifies the user that the reservation is successful. As a method of notifying the user, the mobile terminal 70 may display a message on the display screen or output an audio message from a speaker.

When the set time arrives, the power management ECU 40 switches over from the charging forbidden state to the charging permitted state, thereby starting charging the battery 12 using the external electric power source 50. When the charging starts, the power management ECU 40 sends a charging start notification to the in-vehicle wireless instrument 30. The in-vehicle wireless instrument 30 sends the charging start notification to the mobile terminal 70 via the information center 62. The mobile terminal 70 notifies the user that the charging is started.

Alternatively, the user may start the charging instantaneously (without setting a timer) by performing remote operation. The specific process of instantaneous charging will be omitted and not described. Similarly to the start of the charging, the user may also stop the charging in an instantaneous manner or in a timer setting manner by performing remote operation.

Figure 3:
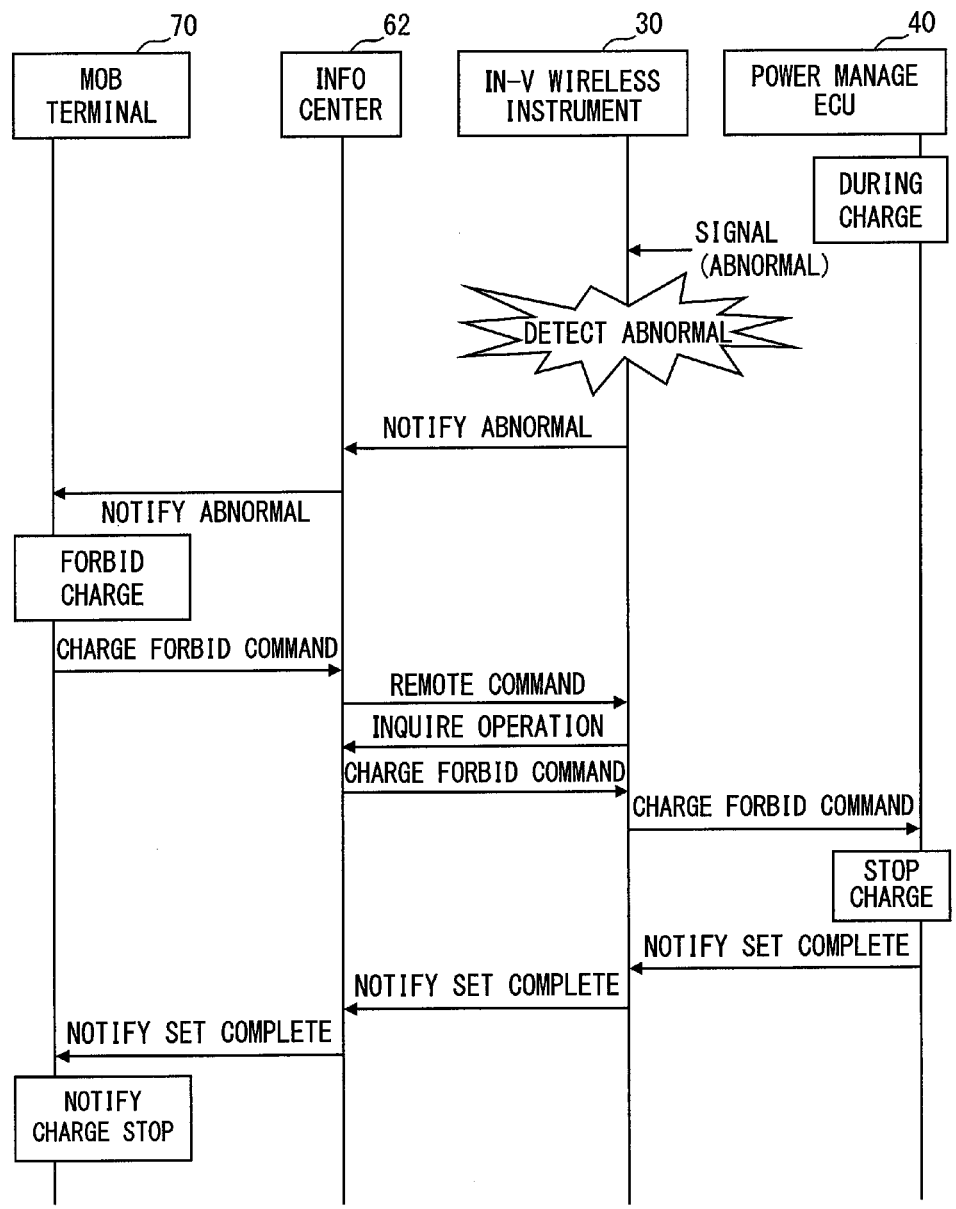
FIG. 3 is a sequence diagram illustrating an example in which an abnormality occurs during charging the battery.

The following describes, with reference to FIG. 3, a sequence of a charging process in a case where an abnormality occurs in the plug-in vehicle 10. In this case, the abnormality occurs in the plug-in vehicle 10 during charging the battery 12 using the external electric power source 50. Further, a sequence of a charging process in a case where an abnormality occurs at a time other than during the charging is similar to the sequence of the above-described case. Hereinafter, the abnormality occurring in the vehicle refers to a specific abnormality, which is related to an unauthorized entry, unlawful entry, or vehicle theft, thereby activating the above-described alert notification function and the tracking function. Examples of the abnormality may include: (i) a case where a door, which has been locked, is unlocked; (i) a case where the window glass is broken; and (iii) a case where the immobilizer is unlocked. Above-described abnormalities are detected by the control circuit 34 according to signals received via the in-vehicle LAN interface 32 and the signal interface 33.

When detecting the abnormality in the plug-in vehicle 10, the in-vehicle wireless instrument 30 sends an abnormality occurrence notification to the information center 62, thereby notifying of the abnormality. When receiving the abnormality occurrence notification from the in-vehicle wireless instrument 30, the information center 62 sends an alert notification responding to the abnormality occurrence notification to the mobile terminal 70. When receiving the alert notification from the information center 62, the mobile terminal 70 notifies the user of the abnormality occurrence in the plug-in vehicle 10.

When a charging forbiddance operation or manipulation is performed by the user, who determines to forbid the charging according to the alert notification, the mobile terminal 70 sends a charging forbidding command to the information center 62 in order to forbid the charging. In response to the receipt of the charging forbidding command from the mobile terminal 70, the information center 62 sends the remote operation command to the in-vehicle wireless instrument 30. Upon receipt of the remote operation command from the information center 62, the in-vehicle wireless instrument 30 inquiries of the information center 62 about an operation, thereby receiving the charging forbidding command from the information center 62. Then, the in-vehicle wireless instrument 30 sends the charging forbidding command to the power management ECU 40.

Upon receipt of the charging forbidding command from the in-vehicle wireless instrument 30, the power management ECU 40 switches over from the charging permitted state to the charging forbidden state, thereby stopping charging the battery 12 using the external electric power source 50. Then, the power management ECU 40 sends the setting completion notification to the in-vehicle wireless instrument 30. The in-vehicle wireless instrument 30 then sends the setting completion notification to the mobile terminal 70 via the information center 62. Upon receipt of the setting completion notification from the in-vehicle wireless instrument 30, the mobile terminal 70 notifies the user that the charging is stopped. That is, the in-vehicle wireless instrument 30 (i.e., the control circuit 34) is configured to perform a charging forbiddance control. As the charging forbiddance control, the wireless instrument 30 (i.e., the control circuit 34) causes the power management ECU 40 to switch over to the charging forbidden state when detecting an abnormality occurring in the plug-in vehicle 10, thereby stopping charging the battery 12 using the external electric power source 50.

Further, the in-vehicle wireless instrument 30 (i.e., the control circuit 34) is configured to automatically perform a discharging acceleration control to accelerate discharging the battery 12 in addition to the above-mentioned charging forbiddance control. In order to accelerate discharging the battery 12, the in-vehicle wireless instrument 30 may cause an ECU that controls an air conditioner of the vehicle to operate at full power, thereby intentionally increasing a power consumption of the battery. The in-vehicle wireless instrument 30 may also turn off a fail-safe function, which is provided for avoiding running out of the battery in a state where the accessory switch (ACC switch) is turned off and the in-vehicle wireless instrument 30 is supplied with the normal power (+B). That is, when the accessory switch is turned off, the in-vehicle wireless instrument 30 is operated in an intermittent standby mode, and a consumption current in the intermittent standby mode is monitored. When the integrated value of the consumption current, which is being monitored, is larger than a predetermined value, the power supply to the in-vehicle wireless instrument 30 is stopped. Thus, when the fail-safe function provided for avoiding running out of the battery is turned off, discharging the battery 12 is accelerated.

Figure 4:
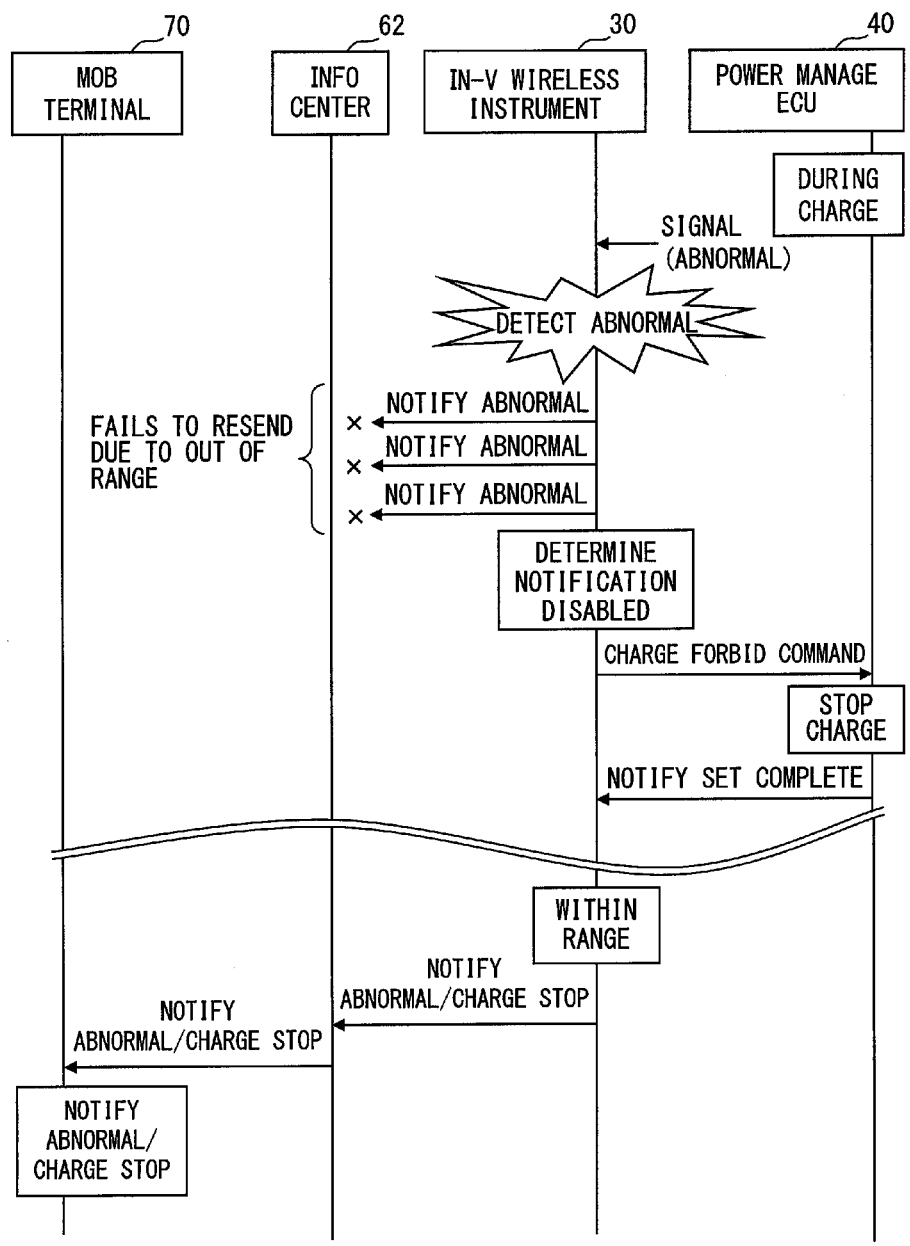
FIG. 4 is a sequence diagram illustrating an example in which communication is temporarily disabled when an abnormality occurs.

The following describes, with reference to FIG. 4, a sequence of a charging process in cases where (i) a temporary communication disability occurs between the in-vehicle wireless instrument 30 and the mobile terminal 70, and (ii) an abnormality occurs in the plug-in vehicle 10, which is described in FIG. 3.

Upon detection of the abnormality occurrence in the plug-in vehicle 10, the in-vehicle wireless instrument 30 tries to send the abnormality occurrence notification to the mobile terminal 70 via the information center 62. However, since the mobile phone network is in a communication disability state (out of a range of the mobile phone network service), the mobile terminal 70 fails to receive the abnormality occurrence notification and is not notified of the abnormality occurrence in the plug-in vehicle 10. When the in-vehicle wireless instrument 30 determines that the mobile terminal 70 can not receive the abnormality occurrence notification, the in-vehicle wireless instrument 30 sends the charging forbidding command to the power management ECU 40. When receiving the charging forbidding command from the in-vehicle wireless instrument 30, the power management ECU 40 switches over immediately from the charging permitted state to the charging forbidden state, thereby stopping charging the battery 12 using the external electric power source 50. Then, the power management ECU 40 sends the setting completion notification to the in-vehicle wireless instrument 30. Similarly to the case shown in FIG. 3, in this case, the in-vehicle wireless instrument 30 accelerates discharging the battery 12.

When the mobile phone network is thereafter recovered from the communication disability (within the range of the mobile phone network service), the in-vehicle wireless instrument 30 sends the abnormality occurrence notification and the charging stop notification to the mobile terminal 70 via the information center 62. Upon receipt of the abnormality occurrence notification and the charging stop notification from the in-vehicle wireless instrument 30, the mobile terminal 70 notifies the user that an abnormality occurred and the charging has been stopped.

[3. Advantage]

As described above, in the present embodiment, when an abnormality related to an unauthorized entry, an unlawful entry, or a vehicle theft is detected, the charging forbiddance control is performed so as to forbid the battery 12 from being charged using the external electric power source 50. Thus, the battery 12 can be controlled depending on different situations. For example, the electricity stored in the battery 12 may be consumed or charging the battery 12 may be stopped. Accordingly, this configuration can help prevent a theft of the plug-in vehicle 10.

Further, when an abnormality related to a theft of the plug-in vehicle 10 is detected, the mobile terminal 70 is notified of the abnormality. Thus, the user of the plug-in vehicle 10 can be notified, via the mobile terminal 70, that an abnormality occurred in the plug-in vehicle 10, even when the user is at a place far away from the plug-in vehicle 10 (out of the plug-in vehicle 10). Furthermore, when necessary, the user can forbid charging the battery 12 using the external electric power source 50 according to his/her own determination. This configuration helps prevent permitting or forbidding of charging the battery 12 against the intention of the user.

Additionally, in cases where the communication via the mobile phone network is temporarily disabled and the abnormality can not be reported to the user, charging the battery 12 using the external electric power source 50 is forbidden without waiting for the user to respond. This configuration can prevent charging of the battery 12 from continuing because of a failure of inquiring of the user resulting from a temporary communication disability, even when the charging needs to be forbidden.

Additionally, since the in-vehicle wireless instrument 30 (i.e., the control circuit 34) is configured to perform a discharging acceleration control to accelerate discharging the battery 12, the electricity stored in the battery 12 can become insufficient faster than a case of only forbidding charging the battery 12 using the external electric power source 50.

In the present embodiment, the wireless communication portion 31 may function as a communication portion, device, or means; the control circuit 34 may function as a detection section, device, or means, e.g., by using the in-vehicle LAN interface 32 and the signal interface 33; the control circuit 34 may function as a charging control section, device, or means; the power management ECU 40 may function as a charging portion, device or means; and the mobile terminal 70 may functions as a communication terminal.

[4. Other Embodiments]

The present disclosure is not limited to the embodiment described above. The present disclosure is intended to cover various modifications and equivalent arrangements.

(1) In the above-described embodiment, when the abnormality related to the theft of the plug-in vehicle 10 is detected, charging the battery 12 is continued until receiving a command from the user. Further, when the mobile phone network is in a temporary communication disability state, charging the battery 12 is exceptionally forbidden without waiting for a command from the user. Alternatively, in cases where, with respect to the inquiry, the user does not send a command (the charging forbidding command or a charging continuation command) even when the mobile phone network is in a communicable state, it is determined that the user fails to check the notification of the abnormality, and charging the battery 12 may be controlled to be forbidden. Alternatively, when an abnormality is detected, charging the battery 12 may be forbidden without inquiring of the user. Specifically, when detecting an abnormality related to an unauthorized entry or unlawful entry to the vehicle, or a theft of the vehicle via the in-vehicle LAN interface 32 and the signal interface 33, the control circuit 34 may instantaneously set the power management ECU 40 to the charging forbidden state with no condition.

(2) In the above-described embodiment, the power management ECU 40 is disposed in the charging path from the external electric power source 50 to the battery 12. Alternatively, the power management ECU 40 may permit/forbid charging the battery 12 from a position external to the charging path. Alternatively, an apparatus other than the power management ECU 40 may be used to control (permit/forbid) charging the battery 12.

While the present disclosure has been described with reference to preferred embodiments thereof, it is to be understood that the disclosure is not limited to the preferred embodiments and constructions. The present disclosure is intended to cover various modifications and equivalent arrangements. In addition, while the various combinations and configurations, which are preferred, other combinations and configurations, including more, less or only a single element, are also within the spirit and scope of the present disclosure.

What is claimed is:

1. A charging control apparatus for an electricity storage apparatus in a vehicle, the electricity storage apparatus being rechargeable using an electric power source placed external to the vehicle, the charging control apparatus comprising:

a charging portion that switches over between a charging permitted state and a charging forbidden state, the charging permitted state being a state in which charging of the electricity storage apparatus using the electric power source is permitted, the charging forbidden state being a state in which charging of the electricity storage apparatus using the electric power source is forbidden;

a detection section that detects an abnormality that occurs in the vehicle; and a charging control section that performs a charging forbiddance control to cause the charging portion to switch from the charging permitted state to the charging forbidden state, when the abnormality that occurs in the vehicle is detected by the detection section; and the charging control section further automatically performing a discharging acceleration control to accelerate discharging of the electricity storage apparatus.

2. The charging control apparatus according to claim 1, further comprising a communication portion in communication with the charging control section that performs communication with a communication terminal placed external to the vehicle, wherein, the charging control section causes the communication portion to communicate with the communication terminal to inquire whether to forbid charging of the electricity storage apparatus, and causes the charging portion to switch to the charging forbidden state when receiving an affirmative response with respect to the forbidding of the charging of the electricity storage apparatus from the communication terminal.

3. The charging control apparatus according to claim 2, wherein when the communication portion cannot communicate with the communication terminal because the communication is disabled, the charging control section causes the charging portion to switch over to the charging forbidden state without waiting for the affirmative response from the communication terminal.

4. The charging control apparatus according to claim 1, wherein the detection section detects an abnormality related to a theft of the vehicle.

5. The charging control apparatus according to claim 1, wherein the detection section detects an abnormality related to an unauthorized entry to the vehicle.

6. The charging control apparatus according to claim 1, wherein the abnormality includes a window glass being broken.

7. The charging control apparatus according to claim 1, wherein the abnormality includes an immobilizer being unlocked.

8. The charging control apparatus according to claim 1, wherein the discharging acceleration control includes operating an accessory of the vehicle at full power.

9. The charging control apparatus according to claim 8, wherein the accessory is an air conditioner of the vehicle.

10. A charging control apparatus for an electricity storage apparatus in a vehicle, the electricity storage apparatus being rechargeable using an electric power source placed external to the vehicle, the charging control apparatus comprising:

a charging portion that switches over between a charging permitted state and a charging forbidden state, the charging permitted state being a state in which charging of the electricity storage apparatus using the electric power source is permitted, the charging forbidden state being a state in which charging of the electricity storage apparatus using the electric power source is forbidden;

a detection section that detects an abnormality that occurs in the vehicle; and a charging control section that performs a charging forbiddance control to cause the charging portion to switch from the charging permitted state to the charging forbidden state, when the abnormality that occurs in the vehicle is detected by the detection section;

a communication portion in communication with the charging control section that performs communication with a communication terminal placed external to the vehicle, wherein, the charging control section causes the communication portion to communicate with the communication terminal to inquire whether to forbid charging of the electricity storage apparatus, and causes the charging portion to switch to the charging forbidden state when receiving an affirmative response with respect to the forbidding of the charging of the electricity storage apparatus from the communication terminal.

11. The charging control apparatus according to claim 10, wherein the detection section detects an abnormality related to a theft of the vehicle, and the charging control section further causes the communication portion to send to the communication terminal a notification indicating a stop of the charging, and the charging control section further automatically performs a discharging acceleration control to accelerate discharging of the electricity storage apparatus.

12. The charging control apparatus according to claim 10, wherein the detection section detects an abnormality related to a theft of the vehicle.

13. The charging control apparatus according to claim 10, wherein the detection section detects an abnormality related to an unauthorized entry to the vehicle.

14. The charging control apparatus according to claim 10, wherein the communication terminal is a cellular phone.

15. The charging control apparatus according to claim 10, wherein the abnormality includes a window glass being broken.

16. The charging control apparatus according to claim 10, wherein the abnormality includes an immobilizer being unlocked.

17. The charging control apparatus according to claim 10, wherein the affirmative response is provided by a user of the communication terminal.

18. The charging control apparatus according to claim 17, wherein the communication terminal is a cellular phone.

* * * * *